United States Patent
Ikeda (10) Patent No.: US 9,036,225 B2
(45) Date of Patent: May 19, 2015

(54) IMAGE READING APPARATUS

(71) Applicant: CANON KABUSHIKI KAISHA, Tokyo (JP)

(72) Inventor: Masahito Ikeda, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/077,838

(22) Filed: Nov. 12, 2013

(65) Prior Publication Data

US 2014/0168729 A1    Jun. 19, 2014

(30) Foreign Application Priority Data

Dec. 13, 2012   (JP) .................. 2012-272094

(51) Int. Cl.
*H04N 1/04*    (2006.01)
*H04N 1/46*    (2006.01)
*H04N 1/00*    (2006.01)
*H04N 1/12*    (2006.01)

(52) U.S. Cl.
CPC ............. *H04N 1/46* (2013.01); *H04N 1/00909* (2013.01); *H04N 1/1235* (2013.01)

(58) Field of Classification Search
CPC .... H04N 1/46; H04N 1/00909; H04N 1/1235
USPC .................. 358/498, 497, 496, 474
See application file for complete search history.

(56) References Cited

U.S. PATENT DOCUMENTS

2010/0085616 A1*   4/2010   Shinno et al. ................ 358/498

FOREIGN PATENT DOCUMENTS

JP    2010-089851 A    4/2010

* cited by examiner

*Primary Examiner* — Houshang Safaipour
(74) *Attorney, Agent, or Firm* — Fitzpatrick, Cella, Harper & Scinto (57) ABSTRACT

An image reading apparatus includes: a feeding portion which feeds an original one by one and passes the original through a reading position; a reading portion which reads an image of the original conveyed at the reading position; a transparent member which is disposed between the original conveyed at the reading position and the reading portion; a cleaning member including a brush which cleans the transparent member, and a shaft member which fixes the brush; and a controller which determines a home position of the cleaning member based on image information acquired from the reading portion when the cleaning member is rotated.

12 Claims, 6 Drawing Sheets

FIG. 4A
NORMAL ROTATION

FIG. 4B
REVERSE ROTATION

IMAGE READING APPARATUS

BACKGROUND OF THE INVENTION

1. Field of the Invention

The present invention relates to an image reading apparatus, and more particularly, to an image reading apparatus of a flow-reading mode by an auto original feeding in a copying machine or a scanner.

2. Description of the Related Art

Conventionally, in an image reading apparatus which optically reads an image of an original, a fixed-reading mode and a flow-reading mode are used alone or in combination. In the fixed-reading mode, an image of an original held on a platen glass is read. In the flow-reading mode, an original is conveyed one by one, and an image of the original is read during conveyance. Since the flow-reading mode can read images of a large quantity of originals by a single operation and has high productivity, the flow-reading mode is commonly used in a monochrome copying machine or a color copying machine.

In the case of the flow-reading mode, a reading optical system is focused on an image plane of an original which is conveyed over a transparent member (reading glass) such as an elongated reading glass. Therefore, it is easily affected by foreign matter such as dust adhered to or remaining on the reading glass, and a portion shielded by the foreign matter becomes a line-shaped image noise in a read image. When the original is a paper, minute foreign matter such as a filler or a fiber included in the paper, for example calcium carbonate, is adhered to the reading glass.

As a measure against the image noise, the following measures have been taken. In the process of processing the read image, the dust on the image is detected and a warning in issued to a user. Image processing is performed to remove the line-shaped noise. The reading glass is shifted such that the dust is not continuously read. However, in these measure, since dust is deposited on the reading glass, it is finally necessary for a service engineer to clean a surface of the reading glass.

Therefore, as disclosed in Japanese Patent Laid-Open No. 2010-89851, there is proposed an image reading apparatus which cleans a top surface of a reading glass by rotating an elastic cleaning member. The method of rotating the cleaning member can be operated between originals being conveyed because a cleaning time is short. Hence, the reading glass can be always kept clean. Therefore, it is effective to the reading in the flow-reading mode.

In the method of rotating the cleaning member, it is necessary to control a position of the cleaning member at the time of starting a job and ending a job, on the assumption that a state in which the cleaning member is directed in an upward direction is a home position. The control at the time of starting the job is done for shading correction. The control at the time of ending the job is done for preventing the cleaning member from being damaged by the user's touch with the cleaning member.

In Japanese Patent laid-Open No. 2010-89851, a detection of a home position of a cleaning member is performed in such a manner that a phase detection portion formed in a gear or a pulley is detected by using a sensor such as a photo interrupter. However, in this case, a space for mounting the sensor is needed, which is disadvantageous to compactification of an apparatus. Also, in the case of using the sensor, it is necessary to consider a phase focusing between a cleaning member and a driving unit at the time of assembling, which is disadvantageous to an assembling property and a maintenance property.

Therefore, it is desirable to provide an image reading apparatus which detects a home position of a cleaning member without using sensors, so that the image reading apparatus can be compact and inexpensive and can improve an assembling property and a maintenance property.

SUMMARY OF THE INVENTION

In order to solve the above problems, a representative configuration of an image reading apparatus according to the present invention includes: a feeding portion which feeds an original one by one and passes the original through a reading position; a reading portion which reads an image of the original conveyed at the reading position; a transparent member which is disposed between the original conveyed at the reading position and the reading portion; a cleaning member including a brush which cleans the transparent member, and a shaft member which fixes the brush; and a controller which determines a home position of the cleaning member based on image information acquired from the reading portion when the cleaning member is rotated.

According to the present invention, the image reading apparatus can be compact and inexpensive and can improve the assembling property and the maintenance property by detecting the home position of the cleaning member without using sensors.

Further features of the present invention will become apparent from the following description of exemplary embodiments with reference to the attached drawings.

DESCRIPTION OF THE EMBODIMENTS

Figure 1:
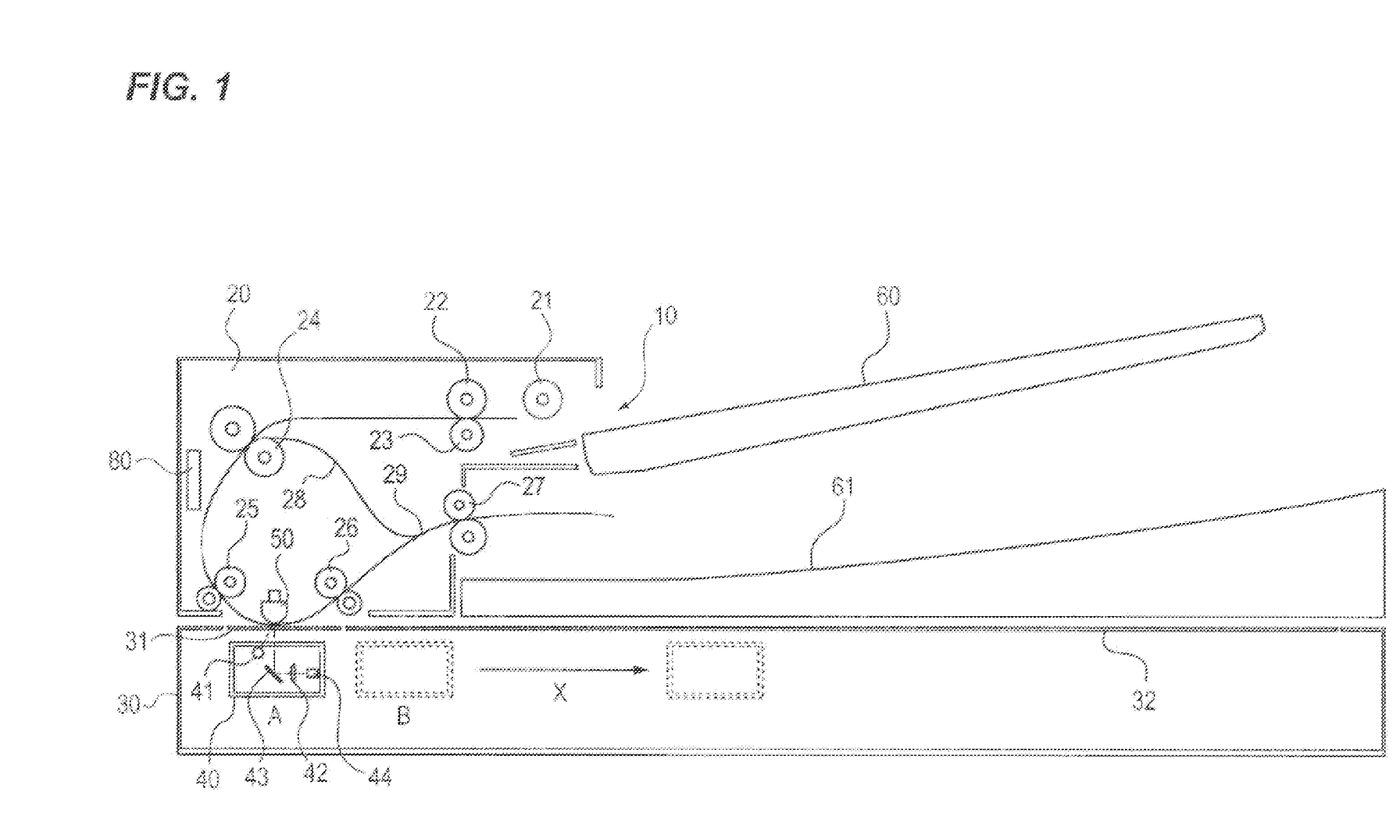
FIG. 1 is a configuration diagram of an image reading apparatus according to an embodiment of the present invention.

An embodiment of an image reading apparatus according to the present invention will be described with reference to the drawings. FIG. 1 is a configuration diagram of the image reading apparatus according to the present embodiment.

As illustrated in FIG. 1, the image reading apparatus 10 of the present embodiment includes an auto original feeding device 20, a flow-reading glass (transparent member) 31, a fixed-reading glass 32, and a scanner (reading portion) 40. The image reading apparatus 10 has a fixed reading mode and flow-reading mode.

The scanner 40 includes al illuminator 41, an imaging lens 42, a mirror 43, and a charge coupled device 44. The illuminator 41 irradiates light on an image plan of an original. The mirror 43 guides a reflected light from the original irradiated by the illuminator 41 to the charge coupled device 44 through the imaging lens 42. The scanner 40 is configured to be reciprocally movable in a longitudinal direction (X direction in FIG. 1) of the fixed-reading glass 32.

The auto original feeding device 20 includes an original holding tray 60, a pickup roller 21, a separation roller 22, a loosening roller 23, a registration roller 24, a pre-reading conveying roller 25, a post-reading conveying roller 26, a discharge roller 27, and an original discharge try 61. The rollers 21 to 27 constitute a feeding portion.

In the fixed-reading mode, an image of an original held on the fixed-reading glass 32 is read by the scanner 40 while the scanner 40 waiting at a reading position B facing one end of the fixed-reading glass 32 is moving in an X direction at a constant speed. In the flow-reading mode, the scanner 40 waits at a reading position A facing the flow-reading glass 31, and an original conveyed over the flow-reading glass 31 at a constant speed by the auto original feeding device 20 is read one by one by the scanner 40. The flow-reading glass 31 is disposed between the original conveyed at the reading position A and the scanner 40.

(Cleaning Member 50)

Figure 2A:
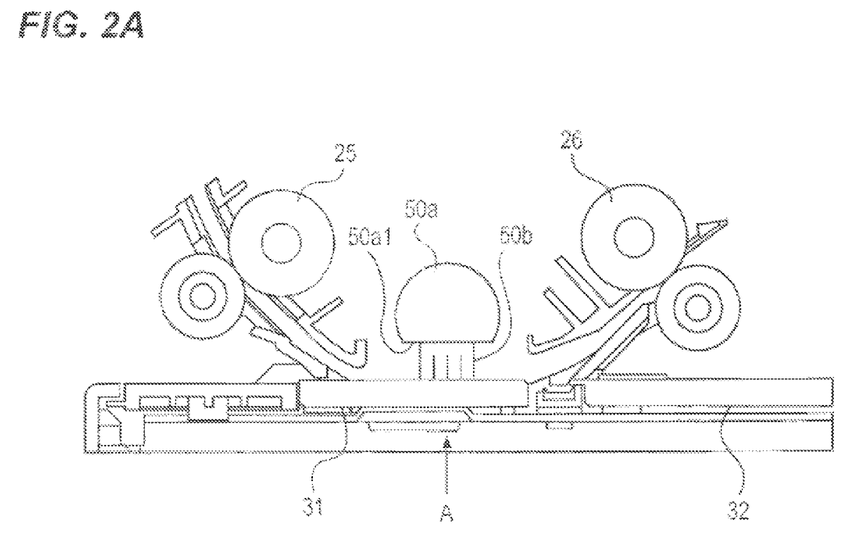
FIGS. 2A and 2B are configuration diagrams of surroundings of a fixed-reading glass of the image reading apparatus according to the present embodiment.
Figure 2B:
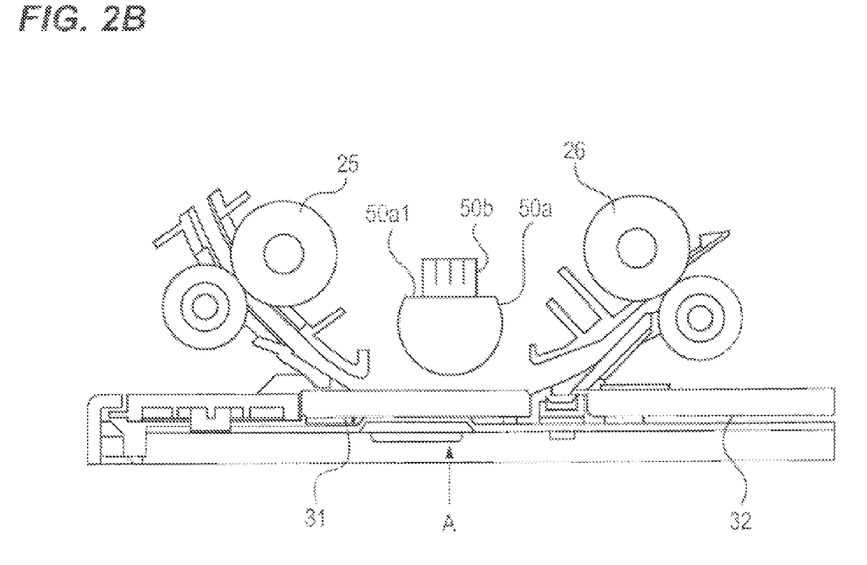

As illustrated in FIGS. 2A and 2B, the image reading apparatus 10 includes a rotatable cleaning member 50. The cleaning member 50 is provided at the reading position A and is provided at an opposite side of the scanner 40 to the flow-reading glass 31. The cleaning member 50 includes a shaft member 50a and a brush 50b.

The shaft member 50a is a rod-shaped member which is elongated in a longitudinal direction of the flow-reading glass 31 (direction perpendicular to an original feeding direction). The shaft member 50a is a white member (color reference portion) for shading correction at the time of reading. The shaft member 50a has a flat surface 50a1 and has a D shape in a cross-section perpendicular to a longitudinal direction of the shaft member 50a. In the brush 50b, an elastically-deformable black fibrous member is fixed to the flat surface 50a1 of the shaft member 50a in a line shape in a longitudinal direction of the shaft member 50a. Since an electromagnetic clutch (not illustrated) is disposed in the shaft member 50a, the shaft member 50a can be rotated at an arbitrary timing.

Figure 3A:
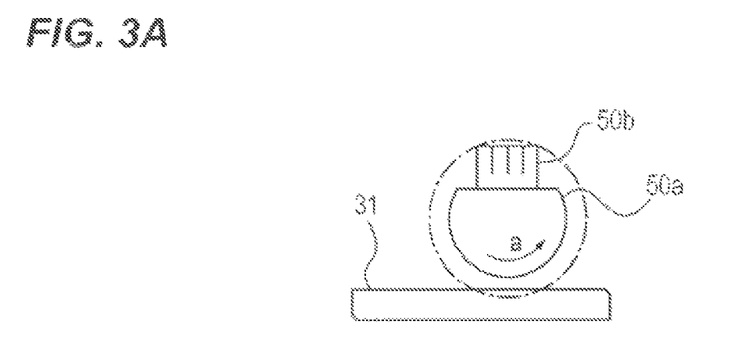
FIGS. 3A to 3C are diagrams describing a rotation of a cleaning member according to the present embodiment.
Figure 3B:
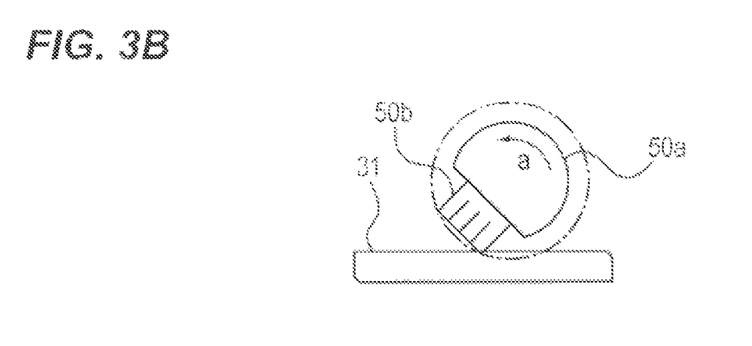
Figure 3C:
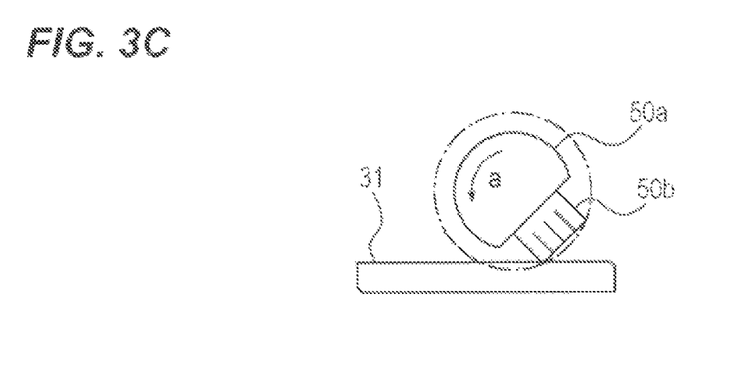

The cleaning member 50 is rotated normally or reversely at a predetermined timing and speed by a motor. As illustrated in FIG. 3A, the brush 50b waits on the assumption that a state in which the brush 50b is directed in an upward direction is a home position. As illustrated in FIGS. 3B and 3C, the brush 50b is reversely rotated from the home position in a direction of an arrow a from an upstream side to a downstream side of the original feeding direction. An end of the brush 50b rubs the surface of the flow-reading glass 31, captures foreign matter on the flow-reading glass 31, eliminates the foreign matter from the flow-reading glass 31, and returns to the home position.

Therefore, the surface of the flow-reading glass 31 (in particular, the reading position A) can be kept in a state of free of the foreign matter, and it is possible to prevent the line-shaped noise from occurring in the read image.

The cleaning of the flow-reading glass 31 by the brush 50b is performed at an arbitrary timing during which the cleaning member 50 does not interfere with the original conveyed at the reading position A. In the present embodiment, basically, the cleaning is performed by normally rotating the cleaning member 50 one revolution immediately before the read job is started or immediately after the read job is ended. Also, the cleaning may be performed between a preceding original and next original. Also, the cleaning may be performed when the number of read originals reaches an arbitrary value.

If the top surface of the flow-reading glass 31 is cleaned by always normally rotating the brush 50b in one direction, the end of the brush 50b is curved in a rotational direction by a long-term use, and thus, the cleaning function may be deteriorated. In order to correct this deformation, the brush 50b may be reversely rotated at an arbitrary timing.

(Feeding Operation of Flow-Reading Mode)

Figure 4A:
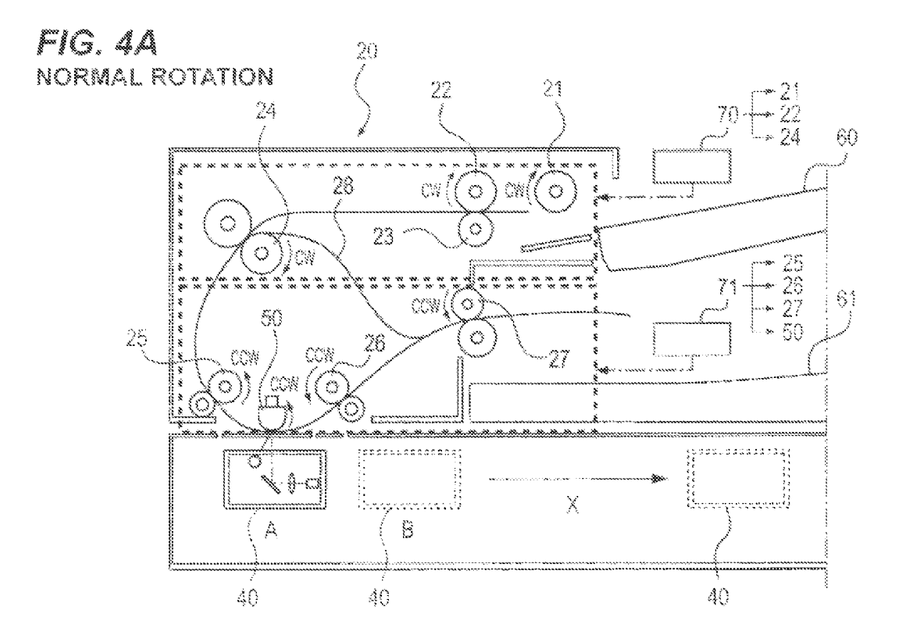
FIGS. 4A and 4B are diagrams describing a flow-reading operation of the image reading apparatus according to the present embodiment.
Figure 4B:
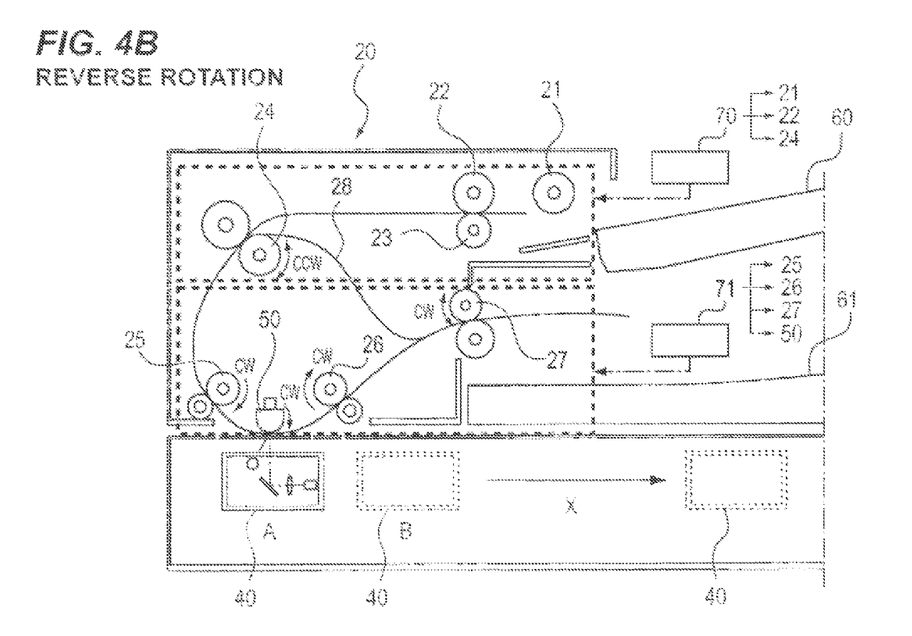

As illustrated in FIGS. 4A and 4B, the auto original feeding device 20 includes a feeding/registration motor 70 and a conveying motor 71 as a driving source.

At the time of single-sided flow-reading, as illustrated in FIG. 4A, the feeding/registration motor 70 is normally rotated, and thus, the pickup roller 21 and the separation roller 22 are rotated in a direction of conveying an original from the original holding tray 60. Therefore, a predetermined number of originals held on the original holding tray 60 are fed by the pickup roller 21, are loosened at a nip portion of the separation roller 22 and the loosening roller 23, and are conveyed to a nip portion of the registration roller 24. Since the registration roller 24 is rotated in a direction opposite to the conveying direction, the registration roller 24 corrects a skew feeding of the original.

After that, as illustrated in FIG. 4B, the feeding/registration motor 70 is reversely rotated, and the original is conveyed in a conveying direction at a reading speed by the registration roller 24. Since a mechanical clutch (not illustrated) is attached to the pickup roller 21 and the separation roller 22, a driving transmission is not performed during the reverse rotation of the feeding/registration motor 70. When the conveying motor 71 is normally rotated, the pre-reading conveying roller 25, the post-reading conveying roller 26, and the discharge roller 27 are rotated at the reading speed, and the original is discharged to the original discharge try 61.

In order to increase productivity when a plurality of originals is processed at a time, after a rear end of a preceding original is discharge out of the registration roller 24, a next feeding can be started by normally rotating the feeding/registration motor 70 again at a timing as early as possible.

At the time of a two-sided flow-reading, like the single-sided flow-reading, after one side (first side) of the original is read, a switchback operation is performed by the discharge roller 27 by reversely rotating the conveying motor 71, and the original passes through a reverse conveyance path 28 and then passes through the registration roller 24 again. Then, again, like the single-sided flow-reading, a back side (second side) of the original is read. Then, in order to align page order of the original on the original discharge try 61, a switchback operation is performed again, so that the original passes through the reverse conveyance path 28 and is discharged to the original discharge tray 61.

(Home Position Detection of Cleaning Member 50)

When the home position detection of the cleaning member 50 (brush 50b) is performed, the scanner 40 waits at the reading position A. Then, the image reading is started at the reading position A, and simultaneously, the cleaning member 50 is rotated by 360°. The shaft member 50a is made of a white material for shading correction, and the brush 50b is made of a black material. Therefore, as illustrated in FIGS. 5A to 5C, a phase section appearing as a black image and a phase section appearing as a white image are generated in a luminance distribution of image information acquired by rotating the cleaning member 50 by 360°.

Figure 5A:
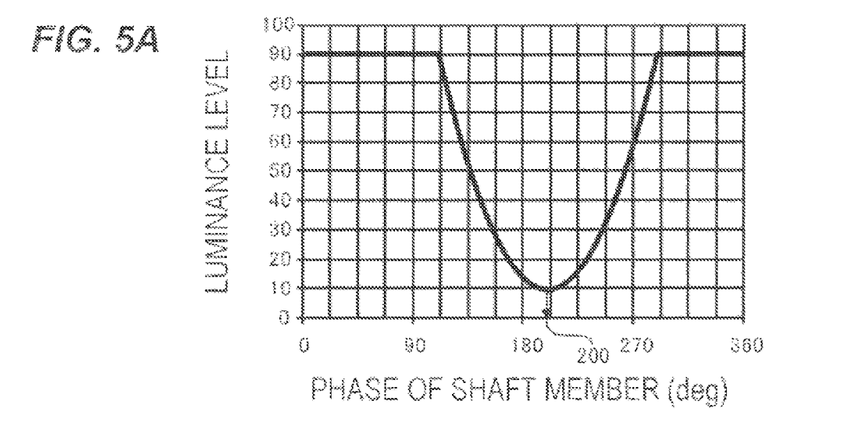
FIGS. 5A to 5C are diagrams illustrating a luminance distribution of a read image when the cleaning member according to the present embodiment makes one rotation.

It can be seen that the present embodiment becomes a luminance distribution illustrated in FIG. 5A, and the entire brush 50b made of a black material comes to a position facing the flow-reading glass 31 at a position of the phase of 200° at which a luminance level is lowest. Thus, it can be seen that the home position of the brush 50b is a position of 20° given by a 180° phase shift from 200°. Therefore, if the cleaning member 50 is rotated in an arbitrary direction and is stopped at a position of a phase of 20°, the cleaning member 50 returns to the home position.

Figure 5B:
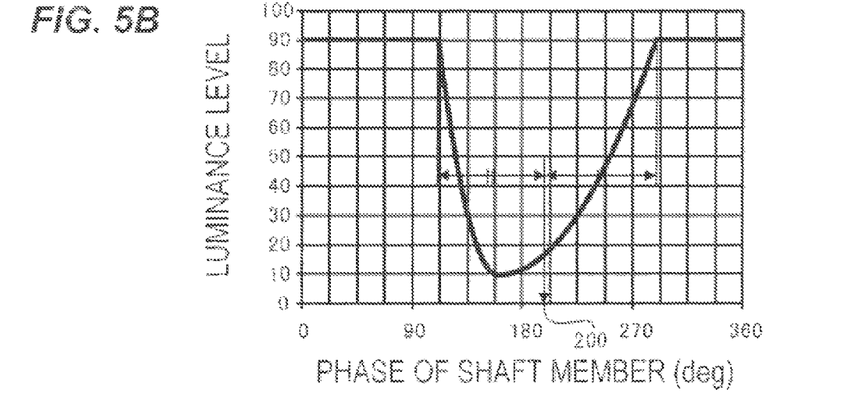
Figure 5C:
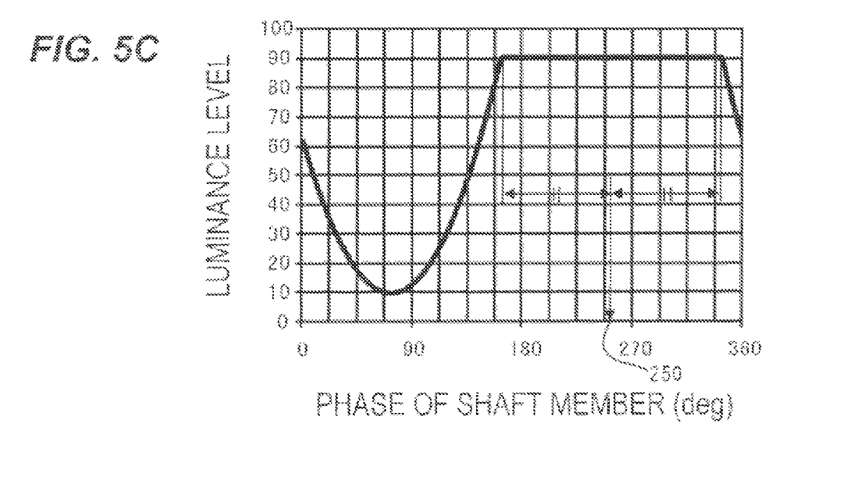

When the brush 50b is deformed by durability, as illustrated in FIG. 5B, it becomes a luminance distribution in which a curve having a low luminance level is deformed as compared with FIG. 5A. In this case, it is determined that the entire brush 50b comes to a position facing the flow-reading glass 31 at a phase corresponding to a middle point of phases to two positions where a luminance distribution changes (middle point of a position where a luminous level is lowered.)

Specifically, it is determined that the entire brush 5b comes to a position facing the flow-reading glass 31 at the phase of 200° corresponding to a middle point of 110° and 290° where a luminance distribution changes. The home position of the brush 50b comes to a position of 20° given by a 180° phase shift from 200°. Therefore, if the cleaning member 50 is rotated in an arbitrary direction and is stopped at a position of a phase of 20°, the cleaning member 50 returns to the home position.

Also, as illustrated in FIG. 5C, it can be seen that the entire brush 50b comes to a position of an opposite side of the flow-reading glass 31 at a phase of 250° corresponding to a middle point of a section where a luminance level is kept constantly high, and this position becomes the home position.
(Controller 80)

As illustrated in FIG. 1, the auto original feeding device 20 includes a controller 80. The controller 80 controls the conveying operation during the flow-reading, and the rotation and the home position detection of the cleaning member 50, which have been described above, and controls a home position return operation, which will be described below.
(Home Position Return Operation, Flow-Reading Operation)

Figure 6:
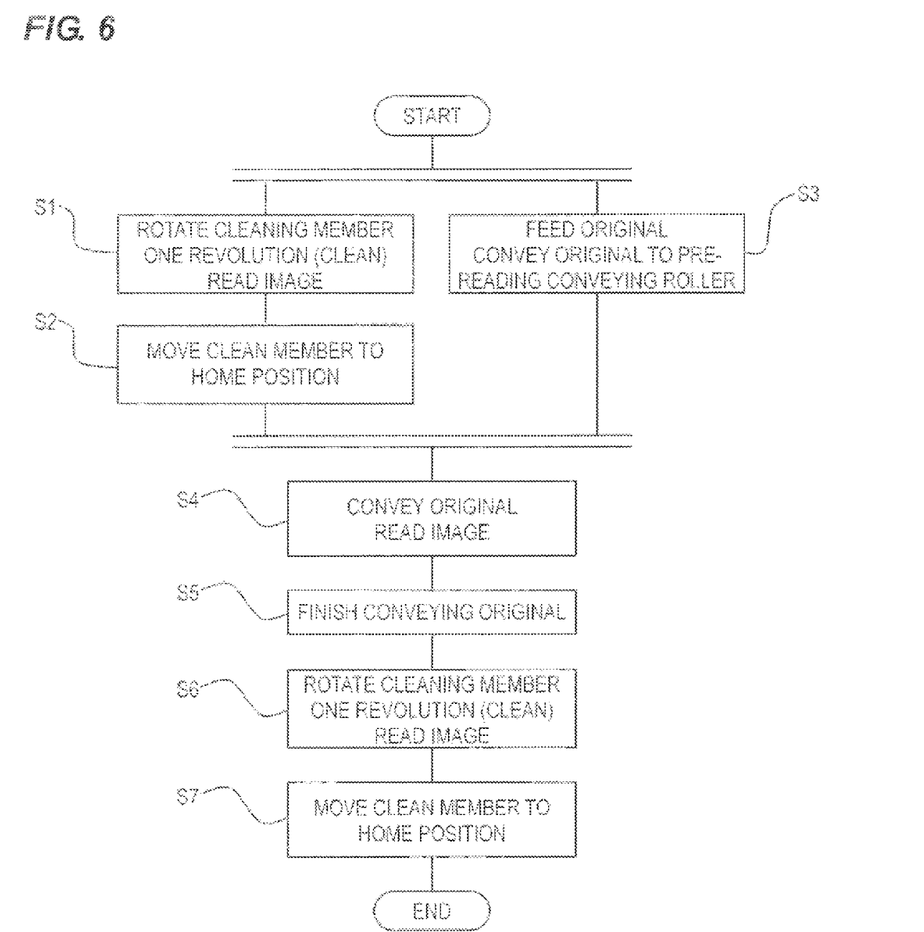
FIG. 6 is a flowchart of a home position return operation.

As illustrated in FIG. 6, when an original image read job is started, the cleaning member 50 makes one rotation, and image reading is performed by the scanner 40 in a state in which an original is not conveyed (S1). Based on luminance information acquired by the image reading, the controller 80 performs the above-described home position detection, and rotates the cleaning member 50 to the detected home position (S2). At this time, at the same time with S1 and S2, the original on the original holding tray 60 is conveyed to the pre-reading conveying roller 25 (S3).

After that, original conveyance and the image reading are performed (S4). After the original conveyance is completed (S5), in a similar manner to S1, the cleaning member 50 makes one rotation and image reading at the time is performed (S6). Based on luminance information acquired by the image reading, the controller 80 performs a home position detection, and stops rotation of the cleaning member 50 by rotating the cleaning member 50 to the detected home position (S7), and the job is ended.

According to the present embodiment, since the home position of the cleaning member 50 can be detected without using sensors, the image reading apparatus can be compact and inexpensive and can improve an assembling property and a maintenance property.

Also, at the time of starting the job and ending the job, the cleaning member 50 can be set to the upward direction (home position). Therefore, at the time of starting the job, the shading correction can be achieved without rotating the cleaning member 50. Also, at the time of ending the job, it is possible to prevent the cleaning member 50 from being damaged by the user's touch with the cleaning member 50.

Also, in the present embodiment, the brush 50b is described as having a black color, but it is not limited thereto. That is, the brush 50b may have other colors having a different luminance level from the white shaft member 50a. For example, the brush 50b may have other colors tinged with a dark color whose luminance level is easily lowered. Since a difference between a luminance level of the brush 50b and a luminance level of the shaft member 50a appreciably appears, the home position can be surely detected. Also, a configuration in which the black brush 50b is provided in the white shaft member 50a and the home position detection is performed based on the luminance level of the read image has been exemplified above. However, the home position detection performed based on the information acquired by line image reading during the rotation of the cleaning member 50 is not limited to the basis on the image of the brush or the image information of the white shaft member. For example, a mark of a color different from the shaft member 50a is assigned at a predetermined position of the shaft member. A position of the mark may be determined from a read image obtained during the rotation of the cleaning member 50, and the home position of the cleaning member 50 may be detected based on that.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2012-272094, filed Dec. 13, 2012, which is hereby incorporated by reference herein in its entirety.

What is claimed is:

1. An image reading apparatus comprising:
   a feeding portion which feeds an original one by one and passes the original through a reading position;
   a reading portion which reads an image of the original conveyed at the reading position;
   a transparent member which is disposed between the original conveyed at the reading position and the reading portion;
   a cleaning member including a brush which has a color and cleans the transparent member, and a shaft member which has a white color and fixes the brush; and
   a controller which determines a home position of the cleaning member in its rotating direction based on a luminance level of the image information acquired from the reading portion when the cleaning member is rotated.

2. The image reading apparatus according to claim 1, wherein the brush has a black color.

3. The image reading apparatus according to claim 1, wherein the home position is a phase given by a 180 .degree. phase shift from a phase at which the luminance level is lowest.

4. The image reading apparatus according to claim 1, wherein the home position is a phase given by a 180 .degree. phase shift from a phase of a middle point of portions where the luminance level are lowered.

5. The image reading apparatus according to claim 1, wherein the home position is a phase of a middle point of a section where the luminance level is kept constantly high.

6. The image reading apparatus according to claim 1, wherein the shaft member is a color reference portion at the time of shading correction.

7. An image reading apparatus comprising:
   a feeding portion which feeds an original one by one and passes the original through a reading position;
   a reading portion which reads an image of the original conveyed at the reading position;

a transparent member which is disposed between the original conveyed at the reading position and the reading portion;

a cleaning member including a brush which has a color and cleans the transparent member, and a shaft member which has a white color and fixes the brush; and a controller which stops rotating the cleaning member at a position based on a luminance level of the image information acquired from the reading portion when the cleaning member is rotated.

8. The image reading apparatus according to claim 7, wherein the brush has a black color.

9. The image reading apparatus according to claim 7, wherein the controller stops the cleaning member at a position given by a 180 .degree. phase shift from a phase at which the luminance level is lowest.

10. The image reading apparatus according to claim 7, wherein the controller stops the cleaning member at a position given by a 180 .degree. phase shift from a phase of a middle point of portions where the luminance level are lowered.

11. The image reading apparatus according to claim 7, wherein the controller stops the cleaning member at a middle point of the section where the luminance level is kept constantly high.

12. The image reading apparatus according to claim 7, wherein the shaft member is a color reference portion at the time of shading correction.

* * * * *